(12) United States Patent
Chang

(10) Patent No.: US 7,180,733 B2
(45) Date of Patent: Feb. 20, 2007

(54) ELECTRONIC DEVICE INSTALLATION DOCK

(75) Inventor: Lu-Chang Chang, Taipei (TW)

(73) Assignee: First International Computer, Inc., Taipei (TW)

( * ) Notice: Subject to any disclaimer, the term of this patent is extended or adjusted under 35 U.S.C. 154(b) by 34 days.

(21) Appl. No.: 10/919,883

(22) Filed: Aug. 17, 2004

(65) Prior Publication Data

US 2006/0012952 A1 Jan. 19, 2006

(30) Foreign Application Priority Data

Jul. 16, 2004 (TW) .............................. 93121377 A

(51) Int. Cl.
*G06F 1/16* (2006.01)
(52) U.S. Cl. ..................................... 361/685
(58) Field of Classification Search ................ 361/685, 361/724–727
See application file for complete search history.

(56) References Cited

U.S. PATENT DOCUMENTS 5,913,926 A * 6/1999 Anderson et al. .............. 714/6
6,272,008 B1 * 8/2001 Huang ......................... 361/683
6,721,186 B2 * 4/2004 Yang ........................... 361/737
2003/0099094 A1 * 5/2003 Coles et al. ................. 361/726
2003/0112596 A1 * 6/2003 Shih ............................ 361/685

\* cited by examiner

*Primary Examiner*—Lynn Feild
*Assistant Examiner*—Ingrid Wright
(74) *Attorney, Agent, or Firm*—Rabin & Berdo, P.C.

(57) ABSTRACT

An electronic device installation dock for installing an electronic device includes a frame which has a housing space for holding the electronic device and a left side wall and a right side wall that have at least one fastener hole, and an elastic housing that is flexible to couple the electronic device and has two lateral sides corresponding to the two side walls. The lateral sides have a fastener corresponding to the fastener hole and are extended to form a carrying part. The electronic device and the elastic housing are coupled and may be jointly slid in the housing space of the frame. The fastener is engaged with the fastener hole at a fastened position in normal, and may be disengaged at a released position by lifting the carrying part.

10 Claims, 7 Drawing Sheets

ELECTRONIC DEVICE INSTALLATION DOCK

FIELD OF THE INVENTION

The present invention relates to an electronic device installation dock and particularly to an installation dock for installing an electronic device without using screws and hand tools.

BACKGROUND OF THE INVENTION

Conventional electronic devices such as storage devices or optical media access devices that are installed in a computer host case, as those shown in FIG. 1, generally are installed by having one electronic device 5 housed in a housing dock 3 of a cubical computer host case 1. The housing dock 3 has a housing space to hold the electronic device 5. The housing dock 3 has two sides each has at least one bore to receive a screw 2 fastened by a hand tool to fasten the electronic device 5 to the housing dock 3. It is not a convenient and speedy operation.

Moreover, the screw 2 has to be un-fastened by the hand tool for removing the electronic device 5 for repairs or installing other electronic devices. Without the hand tool, the electronic device 5 cannot be removed from the housing dock 3. The threads of the screw 2 also are easily damaged by frequent assembly or disassembly, resulting in difficulty of assembly or disassembly. This could cause trouble and annoyance in use.

SUMMARY OF THE INVENTION

In view of the aforesaid problems, the primary object of the present invention is to provide an electronic device installation dock for installing electronic devices without using hand tools. The installation dock has an elastic housing and a mating frame that are coupled flexibly to enable an electronic device to be mounted easily in a data processing equipment such as a computer or personal video recorder (PVR) without using hand tools to fasten screws. Assembly may be accomplished rapidly to avoid the inconvenience of installation.

Another object of the invention is to provide an electronic device installation dock that allows the electronic devices to be removed directly. The installation dock has a flexible carrying part on the surface. Once an electronic device is mounted and anchored, it may be directly removed and carried through the carrying part to make replacement and installation more convenient.

Yet another object of the invention is to provide an electronic device installation dock to facilitate installation and replacement of electronic devices. It has a formed and elastic housing which is flexible and deformable. The elastic housing can hold an electric device. A frame is provided to hold the elastic housing. The frame and the elastic housing have respectively a fastener structure mating each other. The elastic housing may be coupled on the frame through the flexible fastener structure. The fastener structure of the elastic housing also is connected to a flexible carrying part. When the carrying part is grasped and lifted, the fastener structure is retracted to enable the elastic housing to be removed easily from the frame to facilitate installation and replacement.

To achieve the foregoing objects, the electronic device installation dock of the invention includes a frame that has a housing space to accommodate an electronic device and two sides of walls which have at least one fastener hole, and an elastic housing for holding the electronic device that has two lateral sides corresponding to the side walls. The lateral sides have a fastener corresponding to the fastener hole. The lateral sides also are extended to form a carrying part. The electronic device and the elastic housing are coupled and jointly slid into the housing space of the frame. The fastener is coupled with the fastener hole at a fastened position, and is un-fastened and separated from the fastener hole at a released position when the carrying part is lifted.

In one aspect, the carrying part is located on the two lateral sides of the elastic housing in an integrated manner and extended upwards and bent to facilitate user grasping.

In another aspect, the carrying part has a handle in the center in parallel with the two lateral sides of the elastic housing and two connecting parts on two sides of the carrying part such that the handle is in parallel with the surface of the elastic housing and spaced therefrom at a selected distance in normal conditions.

The foregoing, as well as additional objects, features and advantages of the invention will be more readily apparent from the following detailed description, which proceeds with reference to the accompanying drawings.

DESCRIPTION OF THE PREFERRED EMBODIMENTS

Figure 5A:
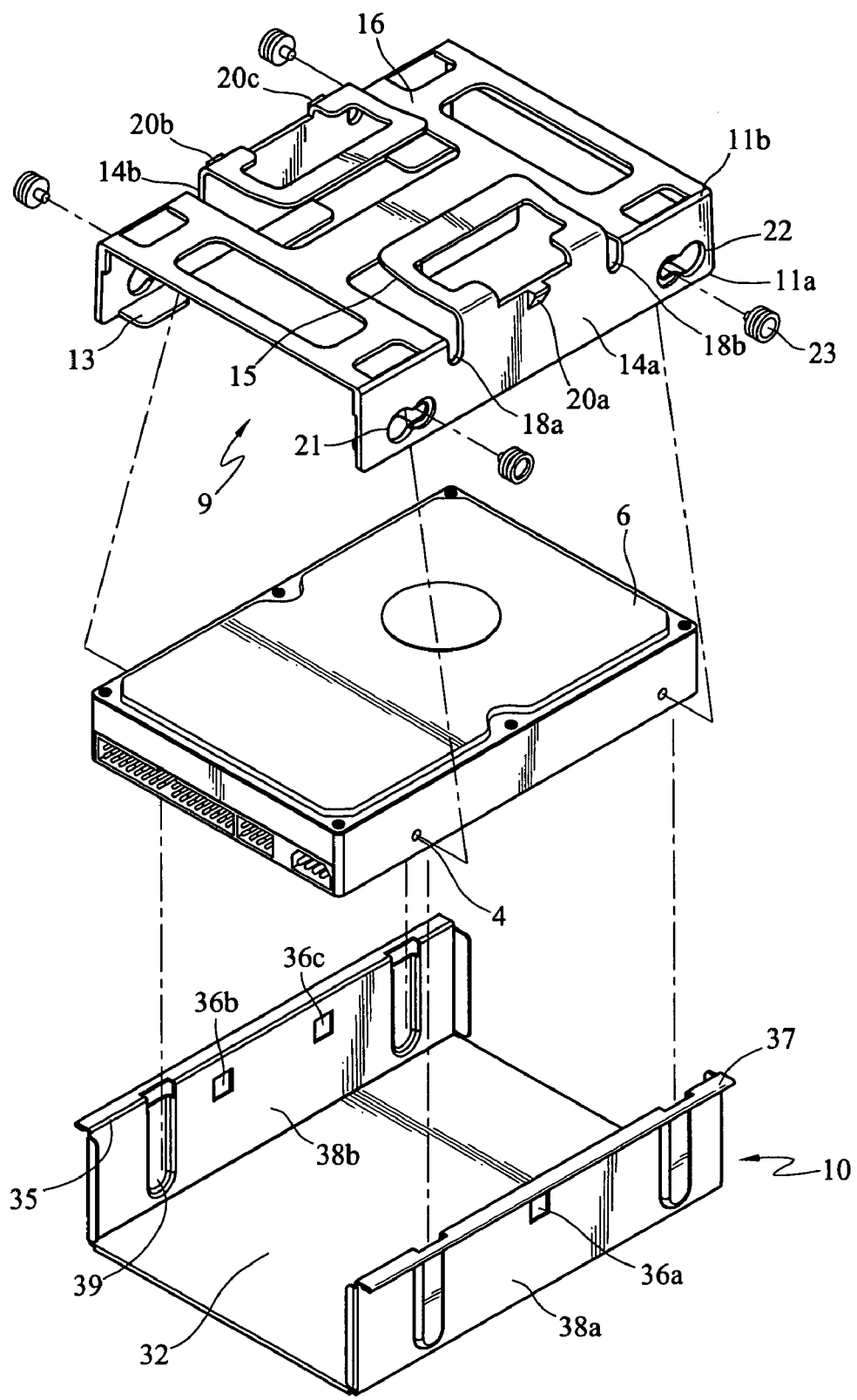
FIGS. 5A and 5B are schematic views of the invention with an electronic device before and after installation.
Figure 5B:
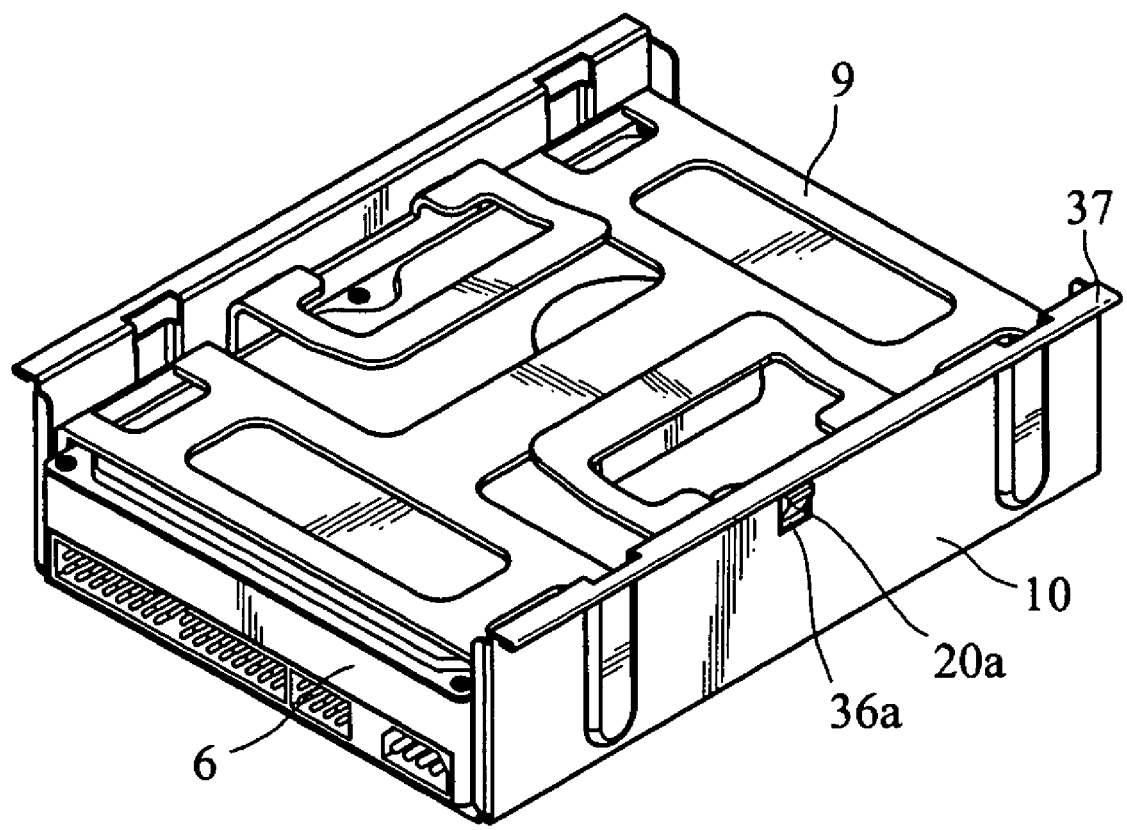

The present invention aims to provide an electronic device installation dock and a method of installation thereof. Refer to FIGS. 5A and 5B for an embodiment of the invention before and after installation.

FIGS. 5A and 5B show an electronic device 6 and an installation dock for holding the electronic device 6. The installation dock mainly includes an elastic housing 9 made of a flexible material and a rigid frame 10 to couple with the elastic housing 9.

The elastic housing 9 has at least one fastener 20a, 20b and 20c on lateral sides to fasten on corresponding fastener holes 36a, 36b and 36c on the frame 10. As the elastic housing 9 is made of the flexible material, when it is placed in the frame 10, the fasteners 20a, 20b and 20c are fastened in the fastener holes 36a, 36b and 36c securely so that the elastic housing 9 is coupled securely on the fame 10.

Figure 1:
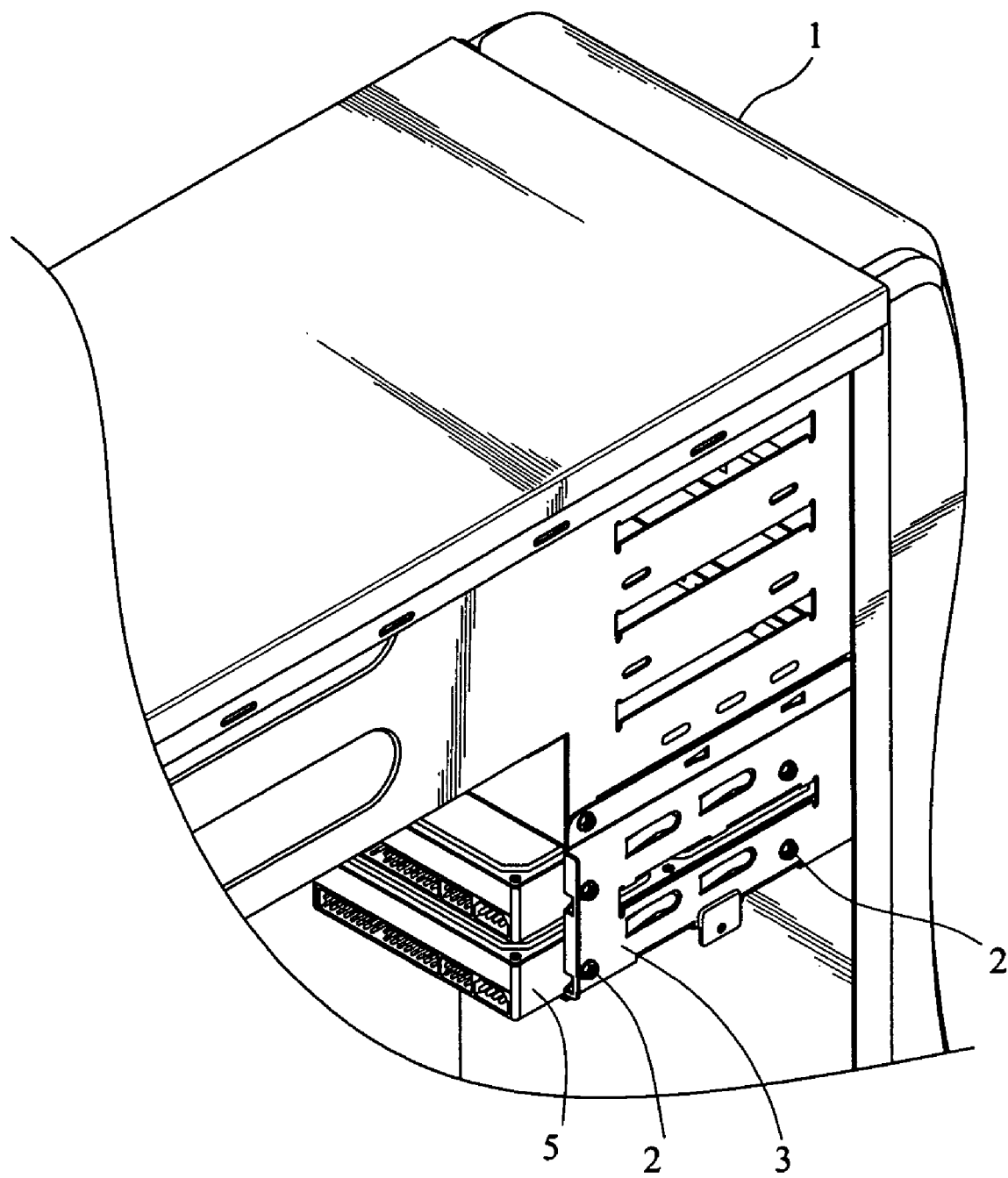
FIG. 1 is a schematic view of conventional electronic devices installed in a computer host.
Figure 2A:
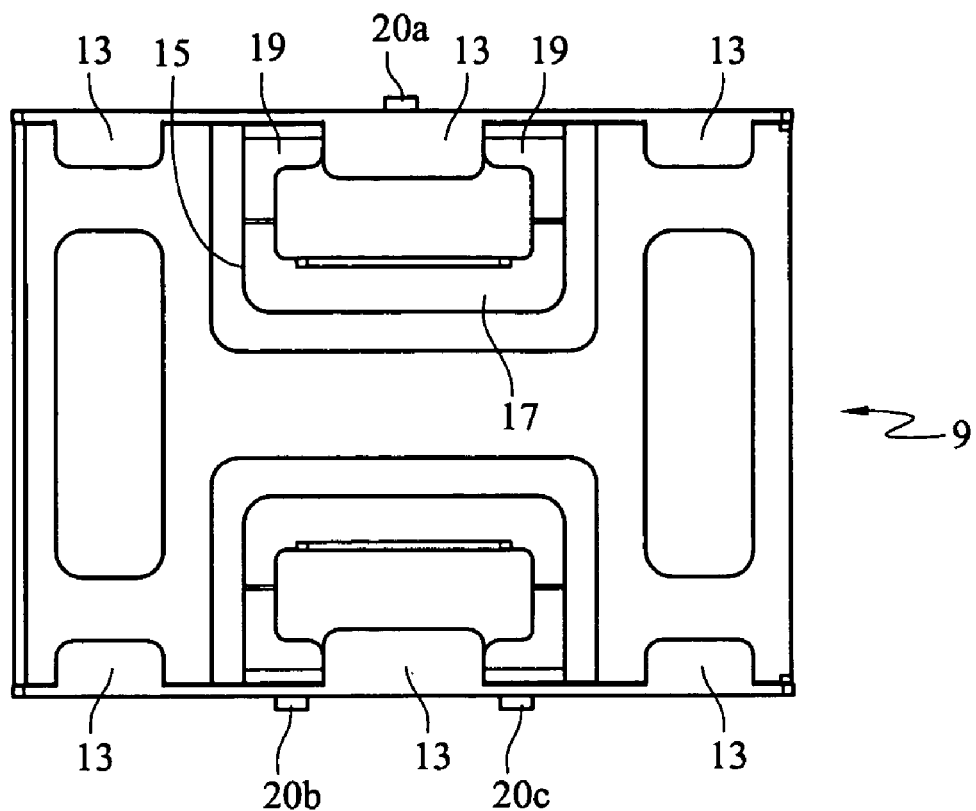
FIGS. 2A, 2B and 2C are a front view, a plane view and a side view of the housing of the electronic device installation dock of the invention.
Figure 2B:
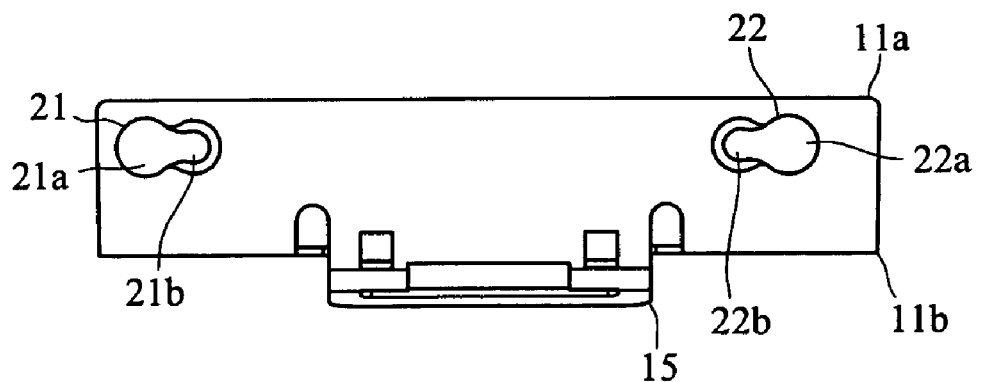
Figure 2C:
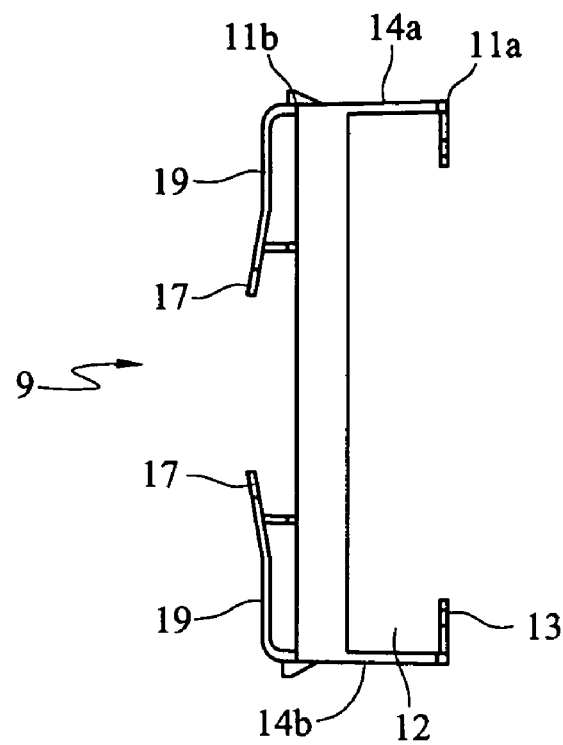

The elastic housing 9 is formed in an integrated manner. It has a first flexible bearer 16 and a flexible carrying part 15 extended upwards and bent in parallel with the first bearer 16 that has an extension with the fasteners 20a, 20b and 20c located thereon. Thus when the flexible carrying part 15 on the left side and the right side is grasped and lifted by a user, the fasteners 20a, 20b and 20c are retracted inwards and separated from the fastener holes 36a, 36b and 36c to enable the elastic housing 9 and the electronic device 6 held therein to be removed easily from the frame 10. The invention, through the flexibility of the elastic housing 9 and the fastener structure set forth above, can easily and rapidly install and replace the electronic device. More details of the invention are elaborated as follow:

Refer to FIGS. 2A, 2B and 2C for an embodiment of the housing of the invention. The elastic housing 9 has a right lateral side 14a and a left lateral side 14b, and a first flexible bearer 16 to form an insertion opening 12. Each of the lateral sides 14a and 14b has a first edge 11a bent to form at least a second flexible bearer 13 which is in parallel with the first flexible bearer 16 and spaced from thereof at a distance matching the height of the electronic device 6 to hold the electronic device 6.

The lateral sides 14a and 14b have a second edge 11b remote from the second flexible bearer 13 with the fasteners 20a, 20b and 20c formed in the middle portion in a protrusive manner corresponding to the fastener holes 36a, 36b and 36c formed on a right side wall 38a and the left side wall 38b of the frame 10. Hence the elastic housing 9 may be held in the frame 10 and fastened in the fastener holes 36a, 36b and 36c to be coupled in the frame 10 securely. There are notches 18a and 18b formed on the lateral sides 14a and 14b abutting the fasteners 20a, 20b and 20c to make retraction or extension of the flexible carrying part 15 easier. The fasteners 20a, 20b and 20c and the fastener holes 36a, 36b and 36c are a fastener structure and a coupling structure mating each other. They may be switched, and their numbers may vary according to requirements, and may be made in other forms as long as they can provide elastic coupling function. The embodiments shown in the drawings serve only illustrative purpose, and are not the limitation of the invention.

The second edge 11b of the lateral sides 14a and 14b further is extended upwards in the center portion and bent in parallel with the first flexible bearer 16 to form the carrying part 15 for user grasping.

The carrying part 15 has a handle 17 and connecting part 19 to connect the handle 17 to the elastic housing 9. The handle 17 is in parallel with the lateral sides 14a and 14b of the elastic housing 9. The connecting parts 19 are bent to connect the second edge 11b of the lateral sides 14a and 14b. In normal conditions, the handle 17 is spaced from the elastic housing 9 at a selected distance to allow users to carry the elastic housing 9 by grasping the handle 17 and pulling off elastic housing 9 from the frame 10. The elastic housing 9 is made of a material that has a desired elasticity, such as plastic or other composite materials.

In short, the elastic housing 9 has elasticity. When it is held in the frame 10, the fasteners 20a, 20b and 20c are coupled securely in the fastener holes 36a, 36b and 36c. Other portions of the elastic housing 9 also are elastic and are clamped by the frame 10 securely and closely.

Moreover, as the flexible carrying part 15, the fasteners 20a, 20b and 20c and the elastic housing 9 are integrally formed, when the flexible carrying part 15 is grasped and lifted, the fasteners 20a, 20b and 20c are retracted and may be easily separated from the fastener holes 36a, 36b and 36c.

In addition, the two lateral sides 14a and 14b of the elastic housing 9 have respectively at least one sliding hole 21 and 22 each consisting of a large hole 21a and a small hole 21b that connects to each other. The small holes 21b and 22b correspond to installation bores 4 of the electronic device 6. A fixing member 23 may be inserted in the large hole 21a, and slid to the small hole 21b to engage with the installation bore 4 to anchor the electronic device 6 on the elastic housing 9.

Figure 3:
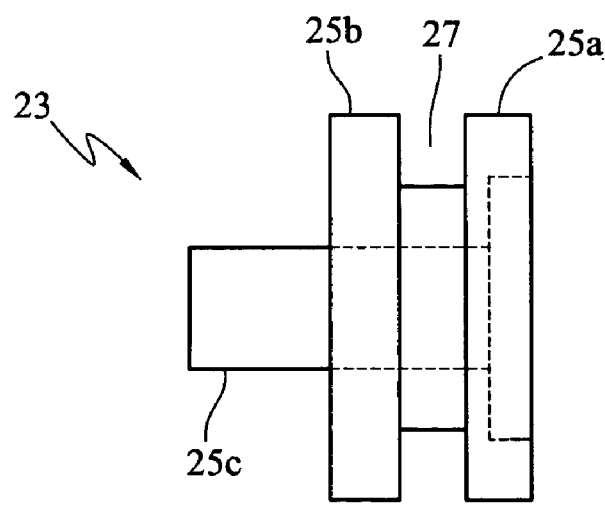
FIG. 3 is a schematic view of an embodiment of the fixing member of the invention.

Refer to FIG. 3 for an embodiment of the fixing member 23. It has a first end 25a, a second end 25b and a pin 25c connecting to the second end 25b to anchor the electronic device 6. The first end 25a and the second end 25b are interposed by an annular groove 27. The first end 25a, second end 25b, pin 25c and annular groove 27 may be integrally formed. After the fixing member 23 is inserted in the sliding hole 21, the annular groove 27 may be slid and positioned in the small hole 21b and inserted in the installation bore 4 to anchor the electronic device 6 on the elastic housing 9. The elastic housing 9 may also not have the sliding holes 21 and 22. In such a circumstance, the fixing member 23 is integrally formed on the elastic housing 9.

Refer to FIG. 3 for an embodiment of the fixing member 23. It has a first end 25a, a second end 25b and a pin 25c connecting to the second end 25b to anchor the electronic device 6. The first end 25a and the second end 25b are interposed by an annular groove 27. The first end 25a, second end 25b, pin 25c and annular groove 27 may be integrally formed. After the fixing member 23 is inserted in the sliding hole 21, the annular groove 27 may be slid and positioned in the small hole 21b and inserted in the installation bore 4 to anchor the electronic device 6 on the elastic housing 9. The elastic housing 9 may also not to provide the sliding holes 21 and 22. In such a circumstance, the fixing member 23 is integrally formed on the elastic housing 9.

Figure 4A:
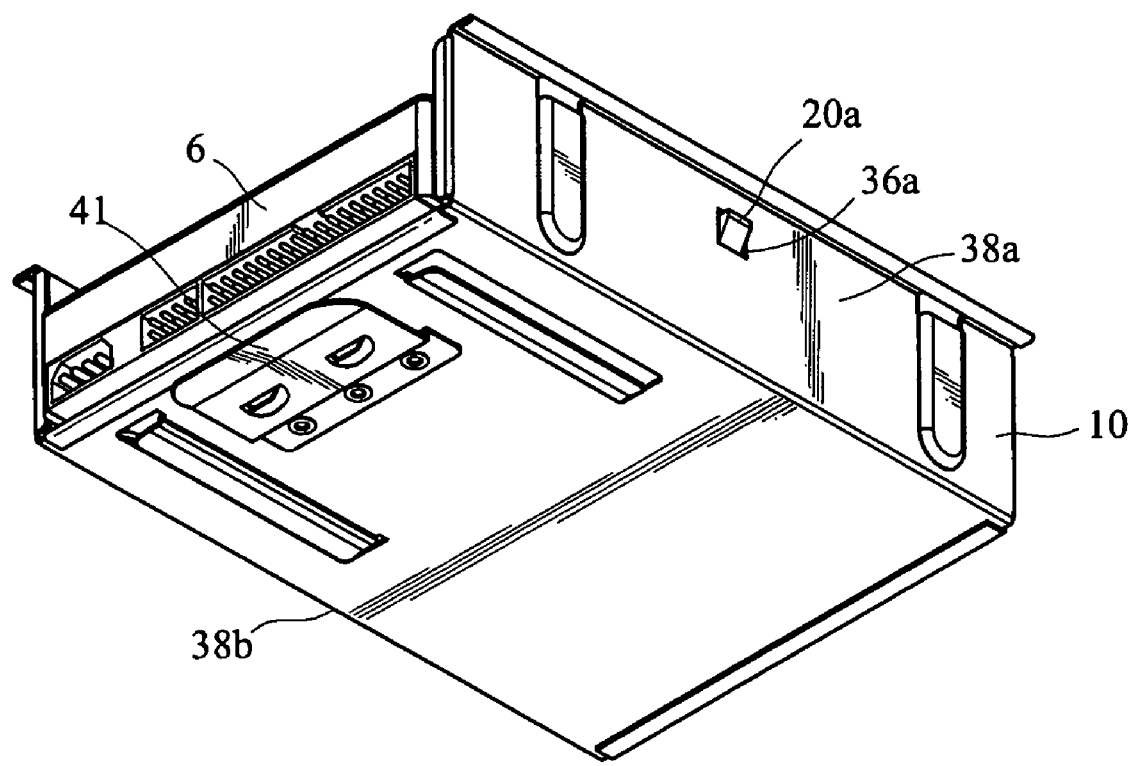
FIG. 4A is a schematic bottom view of an embodiment of the frame of the invention.

Refer to FIG. 4 for an embodiment of the frame of the invention. As shown in FIGS. 4A and 5A, the frame 10 has a housing space 32 matching the elastic housing 9. It has the fastener holes 36a, 36b and 36c on two sides corresponding to the fasteners 20a, 20b and 20c to provide elastic coupling with the elastic housing 9.

For installation of the invention, referring to FIG. 5A, first, move the lateral sides 14a and 14b of the elastic housing 9 outwards to couple the electronic device 6 with the first flexible plate 16 and the second flexible plate 13; align the fixing member 23 with the installation bore 4, and insert the fixing member 23 in the installation bore 4; next, align and slide the fixing member 23 in a sliding trough 39 formed respectively on the side wall 38a and 38b of the frame 10 with the first end 25a of the fixing member 23 confined in the sliding trough 39.

It is to be noted that, as shown in FIG. 4A, the side walls 38a and 38b of the frame 10 have respectively an edge 35 which may be extended and bent to form a coupling flange 37 to rest or wedge in the computer host.

The frame 10 may also have an elastic reed 41 on the bottom to anchor in a corresponding trough formed in the computer host. By depressing the elastic reed 41, the frame 10 may be un-fastened from the trough for removing.

Figure 4B:
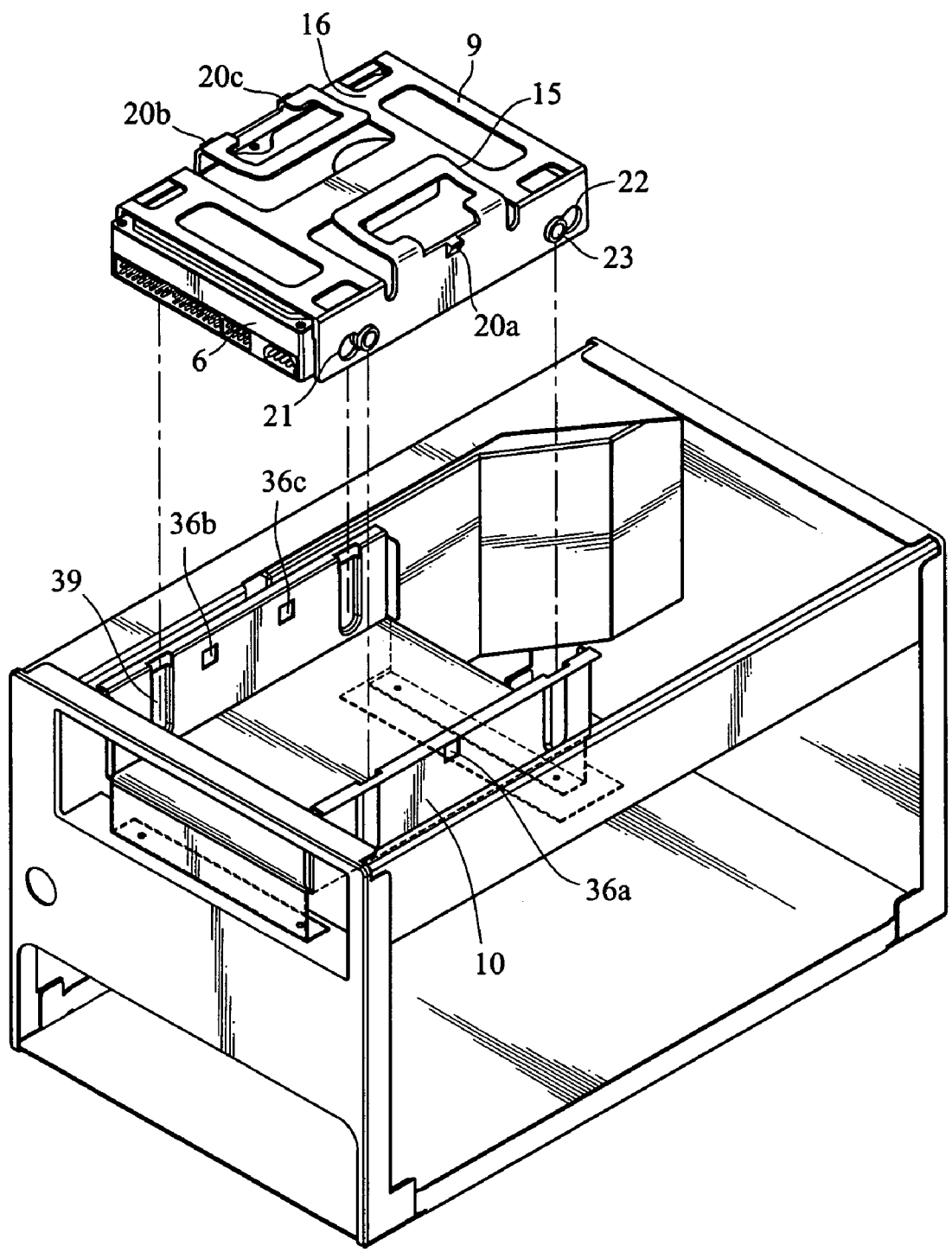
FIG. 4B is a schematic view of another embodiment of the frame of the invention.

Refer to FIG. 4B for another embodiment of the frame adopted on a computer host. The frame 10 is included in the computer host for coupling with the elastic housing 9. The frame 10 is fastened to the computer case by screwing, riveting or other desired means. The side walls 38a and 38b of the frame 10 also have fastener bores 36a, 36b and 36c corresponding to the fasteners 20a, 20b and 20c of the elastic housing 9 to provide elastic coupling.

By means of the constructions set forth above, when in use, the elastic housing 9 has a desired elasticity to couple easily with the electronic device 6 which may be anchored through the fixing members 23 on two sides. Then the elastic housing 9 may be slid into the frame 10 to be coupled through the elastic fasteners 20a, 20b and 20c and fastener holes 36a, 36b and 36c. The protrusive end of the fixing member 23 may be confined in the sliding trough 39. The flexible elasticity of the elastic housing 9 enables it to be coupled with the frame securely and closely.

As the carrying part 15 is integrally formed with the elastic housing 9, the fasteners 20a, 20b and 20c may be retracted and moved away from the fastener holes 36a, 36b and 36c by lifting the carrying part 15. And the elastic housing 9 may be removed at the same time.

In addition, the invention does not use any fastening elements to fasten the electronic device, hence the electronic device may be easily removed or installed on any type of data processing equipment such as a computer or PVR.

In summary, the electronic device installation dock according to the invention can be installed in the data processing equipment without using hand tools. And the installation dock has an elastic housing and a carrying part that enable the electronic device to be easily carried as desired to facilitate installation and replacement.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. An electronic device installation dock for installing an electronic device, comprising:
    a rigid frame which has a left side wall, a right side wall and a housing space, each side wall having at least one fastener hole formed therein;
    an elastic housing having a desired flexibility and a left lateral side and a right lateral side corresponding to the two side walls of the frame, each of the lateral sides being extended to form a left carrying part and a right carrying part, respectively, each carrying part having a fastener that protrudes outward to be received within a corresponding respective fastener hole, each of the lateral sides further having at least one sliding hole formed therein; and
    a plurality of fixing members adapted to be secured to the electronic device, and being removably insertable into a respective sliding hole to fasten the electronic device within the elastic housing;
    wherein the elastic housing is slid in the housing space of the frame such that the fasteners engage with the respective fastener holes to fasten the elastic housing to the frame, the elastic housing being separated from the frame by squeezing the carrying parts toward each other, to thereby remove the fasteners from the respective fastener holes, to allow the elastic housing to be lifted from the frame using the carrying parts.

2. The electronic device installation dock of claim 1, wherein the elastic housing is made from plastics which have a desired flexibility.

3. The electronic device installation dock of claim 1, wherein the elastic housing is made from a composite material which has a desired flexibility.

4. The electronic device installation dock of claim 1, wherein the carrying part includes:
    a handle located in the center thereof in parallel with the two lateral sides of the elastic housing; and
    two connecting parts located on two sides of the carrying part bridging two sides of the handle and the left lateral side and the right lateral side to allow the handle to be in parallel with a first flexible bearing surface of the elastic housing and spaced from the first flexible bearing surface at a selected distance.

5. The electronic device installation dock of claim 3, wherein the carrying part is integrally formed with the elastic housing.

6. The electronic device installation dock of claim 1, wherein each fixing member comprises a pin that is insertable in an installation bore of the electronic device.

7. The electronic device installation dock of claim 1, wherein each fixing member has one end extended outside the elastic housing, the frame having a sliding trough corresponding to the fixing member to allow the extended one end of the fixing member to slide in.

8. The electronic device installation dock of claim 1, wherein the sliding hole includes a large hole and a small hole connecting to the large hole, the fixing member having an annular groove insertable into the large hole and slidable to the small hole for anchoring.

9. The electronic device installation dock of claim 1, wherein the frame further has an elastic reed on the bottom thereof to fasten on a computer host after having slid in the computer host.

10. The electronic device installation dock of claim 1, wherein the two side walls of the frame have respectively a fastener flange to fasten the frame on a computer host.

* * * * *